July 4, 1944. J. R. BRANDON Re. 22,509

CHECK STRAP FOR LOOMS

Original Filed Oct. 8, 1943 2 Sheets-Sheet 1

JOHN R. BRANDON
Inventor

By

Attorney

July 4, 1944. J. R. BRANDON Re. 22,509

CHECK STRAP FOR LOOMS

Original Filed Oct. 8, 1943 2 Sheets-Sheet 2

John R. Brandon
Inventor

By Paul Eaton
Attorney

Reissued July 4, 1944 Re. 22,509

UNITED STATES PATENT OFFICE 22,509

CHECKSTRAP FOR LOOMS

John R. Brandon, Cramerton, N. C.

Original No. 2,347,539, dated April 25, 1944, Serial No. 505,518, October 8, 1943. Application for reissue May 5, 1944, Serial No. 534,282

2 Claims. (Cl. 139—161)

This invention relates to a check strap for looms in which the strap has inner and outer layers formed from one continuous piece of material such as a strap of leather.

It is an object of this invention to provide a check strap for looms having inner and outer layers, both formed from a continuous piece of material, the piece of material having an opening cut about one-half the distance between one end and its central portion, and having a restricted portion formed about one-half the way between the other end of the piece of material and its central portion so that the end of that half having the restriction therein can be passed through the opening in the other half of the piece of material to thus cause both of the free ends to be on the outside of the inner layer thus formed, the extreme ends of the piece of material having in one portion thereof an opening, and in the other portion thereof a restriction, so that the end having the restriction nearest its end can be passed through the opening in the other end of the piece of material to interlock the free ends together, thus forming a check strap from one continuous piece of material having inner and outer layers and having no means except the peculiar configuration of the openings and restrictions for holding the check strap in assembled position.

Some of the objects of the invention having been stated, other objects will appear as the description proceeds when taken in connection with the accompanying drawings, in which.

Referring more specifically to the drawings, the numeral 10 indicates an elongated strap of a suitable material such as leather.

Figure 1:
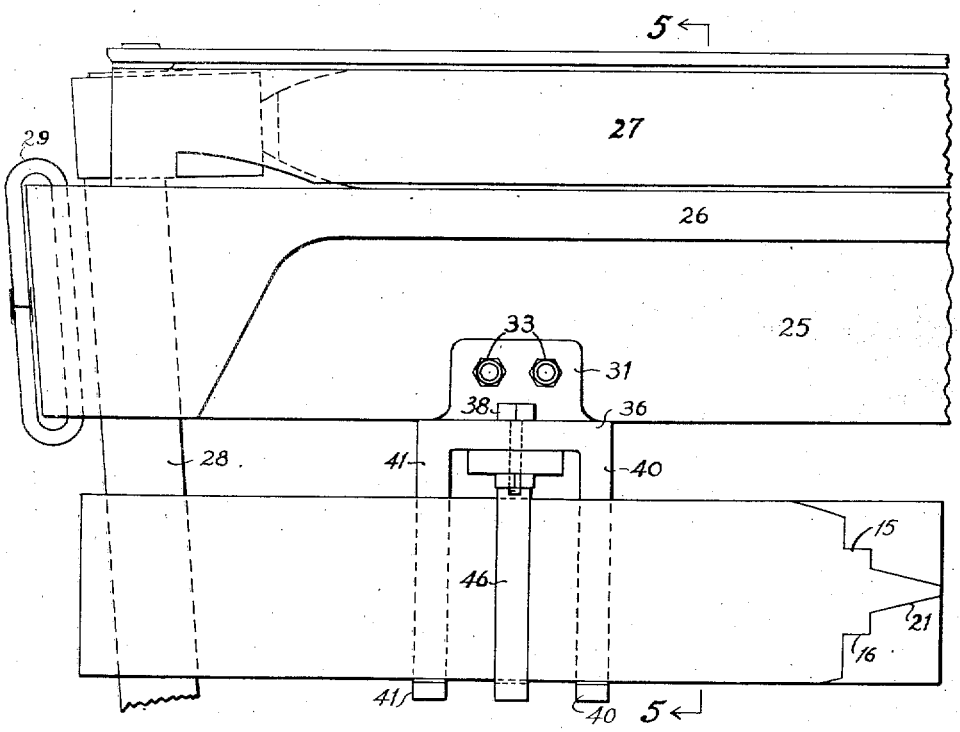
Figure 1 is an elevational view of the lay of a loom showing my invention applied thereto.
Figure 2:
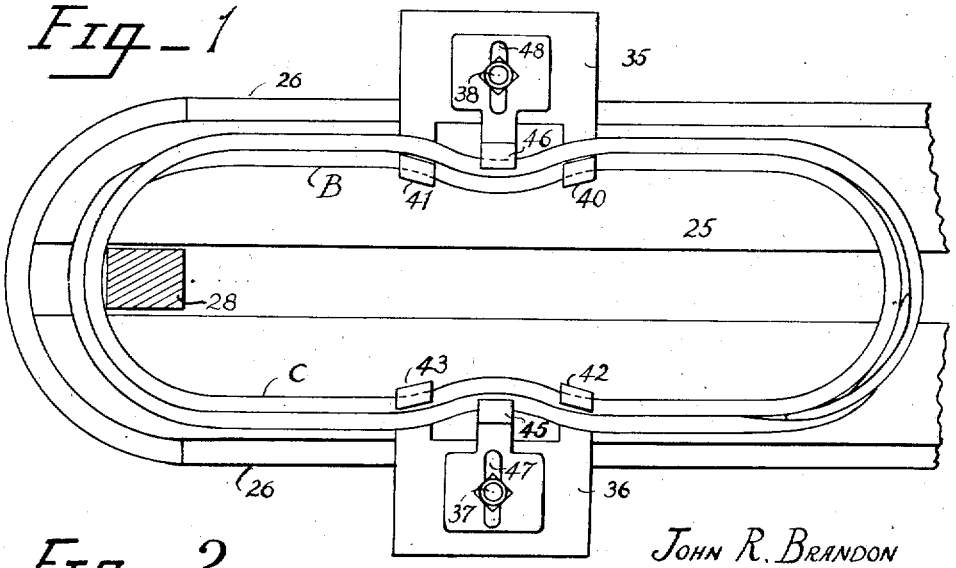
Figure 2 is a bottom plan view looking upwardly from the lower side of Figure 1.
Figure 3:
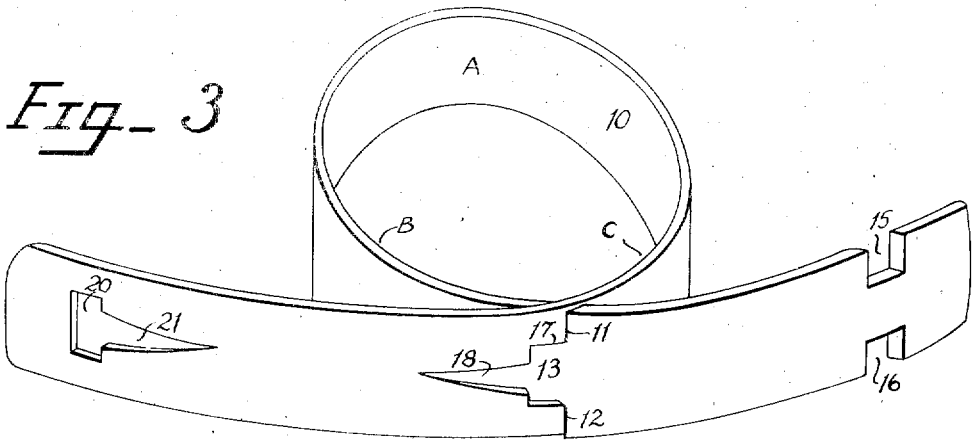
Figure 3 is an isomeric view showing the first step in assembling the check strap from the elongated piece of material.
Figure 4:
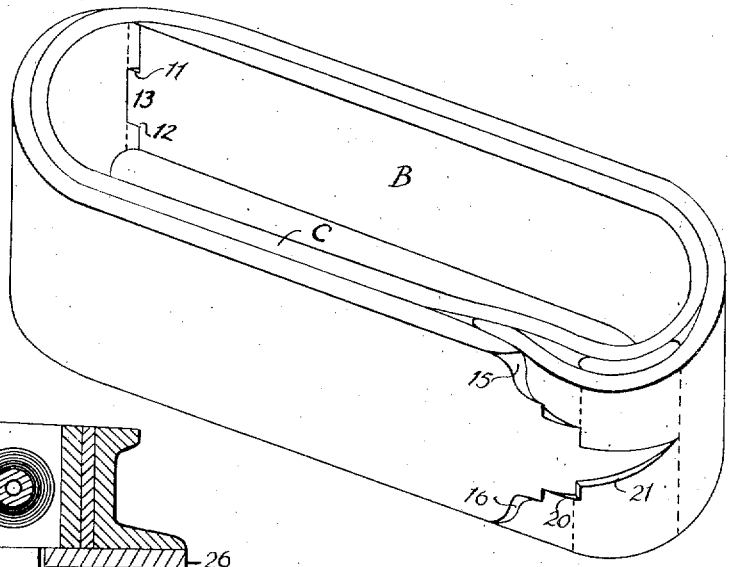
Figure 4 shows the completed check strap as it would appear when installed in the position shown in Figures 1 and 2.
Figure 5:
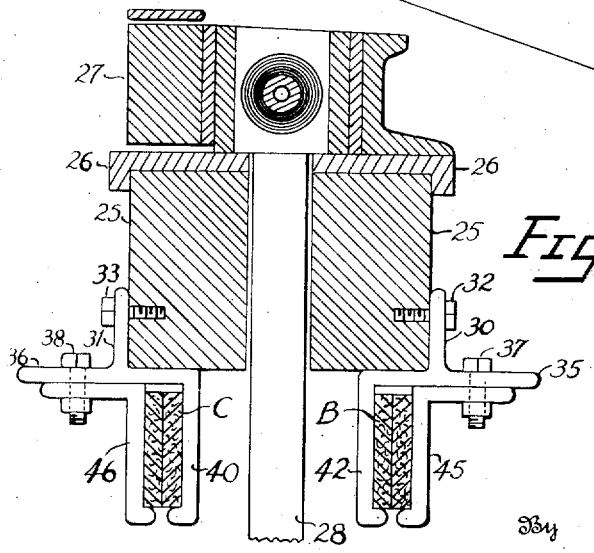
Figure 5 is a vertical sectional view taken along the line 5—5 in Figure 1.

Let us assume that the point A is the middle of the elongated strap 10, and the two halves of the strap are designated by reference characters B and C. The portion B has notches 11 and 12 cut therein leaving a portion 13. These notches are about half-way between the center point A and the notches 15 and 16 cut near the free end of this portion. The portion C has an opening 17 tapering into a slot 18 forming a combined opening which is disposed in the portion C about half-way between the point A and the opening 20 merging with slot 21 near the free end of the portion C. The free end of the portion B is led through the openings 17 and 18 until the restricted portion 13 of part B rests in the opening 17. This now puts the free ends of the portions B and C on the outside of the inner portion of the check strap which has thus been formed. The free ends of portions B and C are brought around the exterior of the first layer already formed, and the free end of portion B is inserted through openings 20 and 21 until the notches 15 and 16 rest against the upper and lower walls of opening 20 as shown in Figure 4. With the check strap thus assembled, it is ready for use, and Figures 1, 2, and 5 show how the assembled structure, as shown in Figure 4, is used. A conventional loom lay 25 has a race plate 26 and conventional shuttle box 27. It also has a picker stick 28 and a buffer strap 29. On each side of the lay, there are mounted brackets 30 and 31 by any suitable means such as bolts 32 and 33. Each of these brackets have horizontal portions 35 and 36 penetrated by bolts 37 and 38. These brackets project beneath the lay 25 and have two downwardly directed spaced prongs 40 and 41 and similar prongs 42 and 43 on bracket 30. Additional adjustable brackets 45 and 46 have slots 47 and 48 therein which are penetrated by the bolts 37 and 38 respectively; whereby, a tortuous path is created for the check strap to apply the proper amount of resistance against movement and to thus arrest the picker stick 28 in its outward and inward travels.

When the check strap is assembled, as shown in Figure 4, it is then placed in position in the loom as shown in Figures 1, 2, and 5, so that the points where one end portion of the strap penetrates the other end portion at the intermediate points, and also at the extremities of the strap will not be in the path of the picker stick, nor will such points be located where they would be engaged by the friction prongs 40, 41, 42, 43, 45, and 46.

It is thus seen that I have provided a check strap having inner and outer layers composed of one continuous strap and joined together by means of openings and restricted portions cut in the strap itself to make a strap capable of being quickly assembled around the picker stick and likewise very easily disassembled for renewal. This saves a lot of time and labor in that in a continuous check strap sewed or permanently secured together, the same cannot be installed without removing the picker stick but by using my check strap, a worn-out check strap can be quickly renewed without dismantling any portion of the loom.

In the drawings and specification, there has been set forth a preferred embodiment of the invention, and although specific terms are employed, they are used in a generic and descriptive sense only and not for purposes of limitation, the scope of the invention being defined in the claims.

I claim:

1. A check strap for looms comprising a unitary strap formed into an endless belt having inner and outer layers, the strap having an opening intermediate its ends and also having a restricted portion spaced from the opening, the strap being led through the opening until its restricted portion rests in the opening to thus form the inner layer of the check strap, and the free end portions of the strap being folded around the inner layer and having the ends thereof secured together.

2. A check strap for looms having inner and outer layers formed from one continuous piece of material, the piece of material having an opening disposed substantially one-half the distance between one end of the material and its central portion and having a restricted portion substantially one-half the distance between the other end of the material and its central portion so that the portion of the material having the restricted portion can be led through the opening until the restricted portion rests in the opening to form the inner layer of the check strap, the extreme end portions having an opening and a restricted portion so that the last-named restricted portion can be inserted through the last-named opening to form the outer layer of the check strap.

JOHN R. BRANDON.